US012578421B2

(12) United States Patent
Wu et al.

(10) Patent No.: US 12,578,421 B2
(45) Date of Patent: Mar. 17, 2026

(54) METHODOLOGY FOR LOCATING SOUND SOURCES BEHIND A SOLID STRUCTURE

(71) Applicant: Wayne State University, Detroit, MI (US)

(72) Inventors: Sean F. Wu, Troy, MI (US); Antonio Figueroa Mombela, Farmington, MI (US); Yazhong Lu, Troy, MI (US)

(73) Assignee: Wayne State University, Detroit, MI (US)

( * ) Notice: Subject to any disclaimer, the term of this patent is extended or adjusted under 35 U.S.C. 154(b) by 268 days.

(21) Appl. No.: 18/124,186

(22) Filed: Mar. 21, 2023

(65) Prior Publication Data

US 2023/0296723 A1 Sep. 21, 2023

Related U.S. Application Data

(60) Provisional application No. 63/321,906, filed on Mar. 21, 2022.

(51) Int. Cl.
*G01S 5/22* (2006.01)
*H04R 1/40* (2006.01)
(Continued)

(52) U.S. Cl.
CPC .............. *G01S 5/22* (2013.01); *H04R 1/406* (2013.01); *H04R 3/005* (2013.01); *H04R 23/008* (2013.01);
(Continued)

(58) Field of Classification Search
CPC ...... H04R 23/008; H04R 3/005; H04R 1/406; H04R 2430/20; H04R 2430/01; H04R 2201/401; G01H 9/002; G01S 5/22
See application file for complete search history.

(56) References Cited

U.S. PATENT DOCUMENTS 7,995,770 B1 * 8/2011 Simon .................... H04R 3/005
455/42
8,588,432 B1 * 11/2013 Simon .................... H04R 27/00
381/98
(Continued)

FOREIGN PATENT DOCUMENTS

WO 2006104931 A2 10/2006

OTHER PUBLICATIONS

International Search Report dated Jun. 30, 2023, Int. App. No. PCT/US2023/015774.
(Continued)

*Primary Examiner* — Daniel L Murphy
*Assistant Examiner* — Amie M Ndure
(74) *Attorney, Agent, or Firm* — Fishman Stewart PLLC

(57) ABSTRACT

A system for locating a sound source includes at least four emitter/receiver pairs, each emitter/receiver pair of the at least four emitter/receiver pairs including a laser emitter and a receiver external to an enclosed structure. The laser directs a laser beam onto a respective reflector surface location on an outer surface of the structure, the respective reflector surface location being caused to vibrate due to sound waves generated from a sound source at a sound source location within the enclosed structure. The receiver receives vibrational signals from the laser beam on the surface at the respective reflector surface location and converting the vibrational signals to acoustic signals. A processor coupled to the emitter/receiver pairs for utilizing the acoustic signals to determine a time difference of arrival of the sound waves to the respective reflector surface locations to determine the sound source location based on the time difference of arrivals.

20 Claims, 7 Drawing Sheets

(51) Int. Cl.
    *H04R 3/00*      (2006.01)
    *H04R 23/00*     (2006.01)

(52) U.S. Cl.
    CPC .... *H04R 2201/401* (2013.01); *H04R 2430/01*
    (2013.01)

(56)                References Cited

U.S. PATENT DOCUMENTS

| | | | | |
|---|---|---|---|---|
| 10,816,939 | B1 * | 10/2020 | Coleman | G01S 17/86 |
| 2006/0106375 | A1 * | 5/2006 | Werneth | A61B 18/1492 |
| | | | | 606/41 |
| 2010/0280826 | A1 * | 11/2010 | Bakish | G01H 9/00 |
| | | | | 704/226 |
| 2016/0061929 | A1 * | 3/2016 | Wu | G01S 3/8006 |
| | | | | 367/124 |
| 2016/0187453 | A1 * | 6/2016 | Wang | H04R 1/326 |
| | | | | 367/127 |
| 2017/0064441 | A1 * | 3/2017 | Kanamori | G01S 3/801 |

| | | | | |
|---|---|---|---|---|
| 2019/0075393 | A1 * | 3/2019 | Nakadai | G10L 21/0272 |
| 2019/0278354 | A1 * | 9/2019 | Alameh | G06F 3/013 |
| 2022/0057519 | A1 * | 2/2022 | Goldstein | G01S 17/88 |

OTHER PUBLICATIONS

S. Wu et al., "Locating arbitrarily time-dependent sound sources in three dimensional space in real time." The Journal of the Acoustical Society of America, 2010, vol. 128, No. 2; pp. 728-739, doi:10. 1121/1.3455846.

S. Wu et al., "Locating Multiple Incoherent Sound Sources in 3D Space in Real Time," SAE Technical Paper 2011-01-1667, 2011, https://doi.org/10.4271/2011-01-1667.

N. Zhu et al., "Sound Source Localization in Three-Dimensional Space in Real Time With Redundancy Checks," Journal of Computational Acoustics, 2020, vol. 20 : pp. 1250007.

S. Wu et al., "Passive sonic detection and ranging for locating sound sources," The Journal of the Acoustical Society of America, 2013, vol. 133, No. 6 , pp. 4054-4064. doi:10.1121/1.4803887.

* cited by examiner

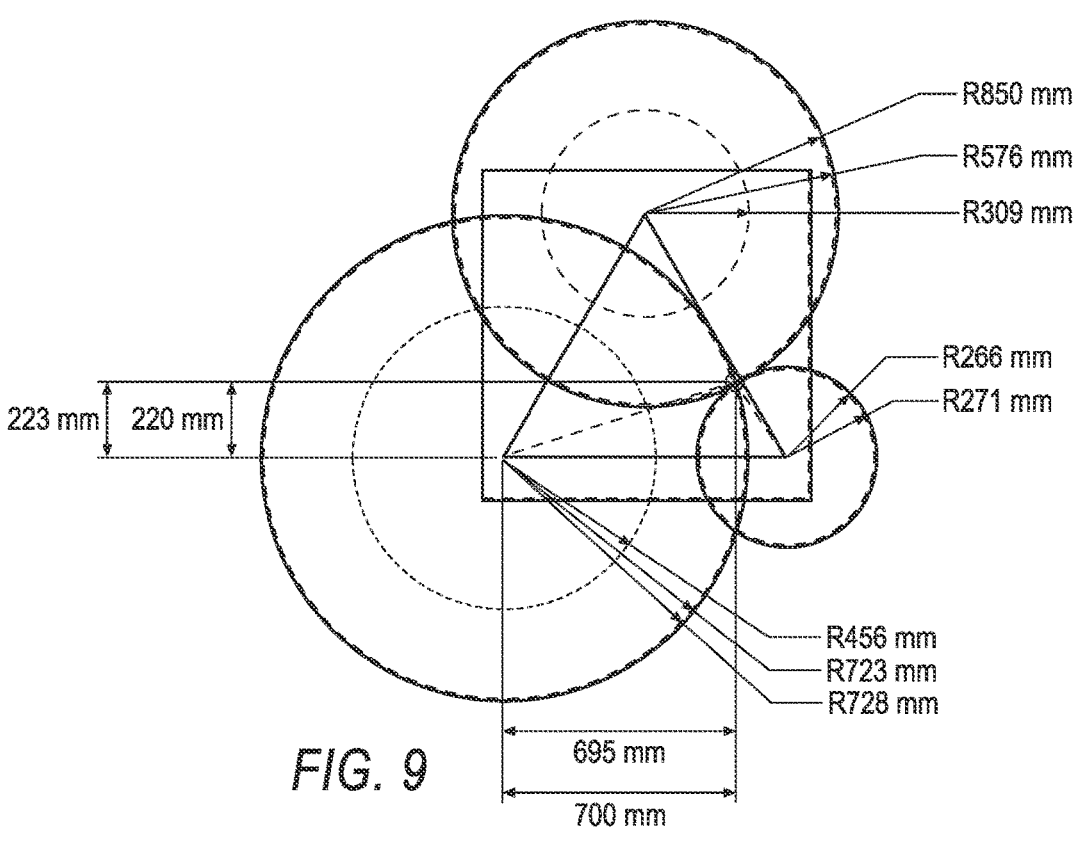
*FIG. 9*
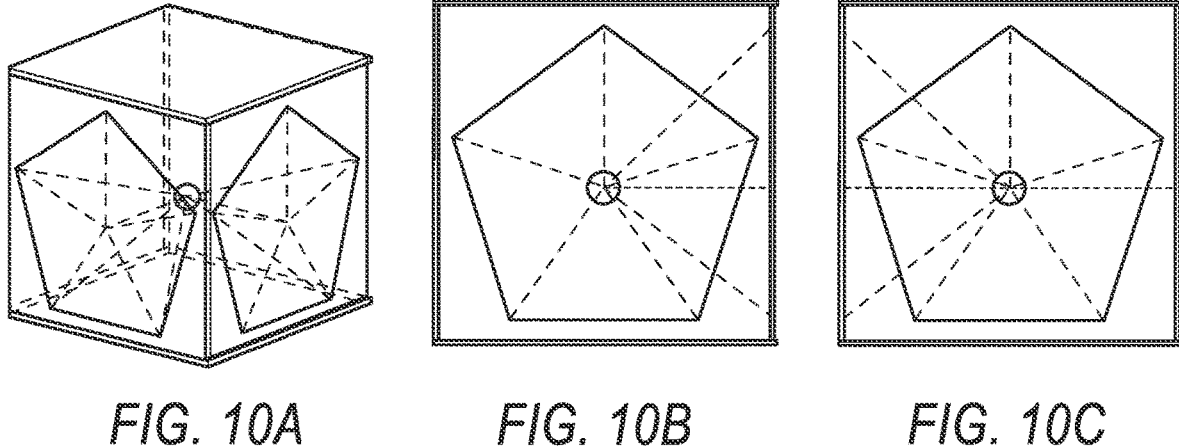
*FIG. 10A*        *FIG. 10B*        *FIG. 10C*

METHODOLOGY FOR LOCATING SOUND SOURCES BEHIND A SOLID STRUCTURE

CROSS-REFERENCE TO RELATED APPLICATION

This application claims priority to U.S. Provisional Application 63/321,906, filed on Mar. 21, 2022, the contents of which is incorporated herein by references in its entirety.

TECHNICAL FIELD

This disclosure relates generally to a system and method of locating sound sources behind or inside a solid structure.

BACKGROUND

Sound source localization has been utilized to locate sounds in open spaces. The understood principle for which sound source localization is possible resides in the fact that sound waves emitted by a point source expand spherically at a constant radiation rate in homogeneous and quiescent elastic media, such as air or a gas, under the relationship:

$$p = \frac{A}{r} e^{j(\omega t - kr)}.$$

By placing receiving sensors such as microphones in arbitrary locations in the carrying elastic media, it may be possible to determine a phase difference of the traveling waves at those locations. In the time domain, a change in phase with respect to a reference point may be correlated to time delays or Time Difference of Arrival (TDOA) between receiving sensors.

A number of different technologies have been developed by taking advantage of the fact that TDOA is measurable between pairs of receiving sensors interrogating a traveling pressure wave emitted by a sound source. Time reversal, beamforming, and triangulation are the widely used methodologies for sound source localization in free space and when the line of sight is not blocked between individual sensors.

Beamforming methodologies have been implemented by processing acoustic pressure measurements taken via an array of multiple microphones positioned within a structure. Based on time signal delays, phase adjustments, and numerical correlations of the input data, they can locate a sound source, discriminate between multiple sound sources, or characterize a sound source; however, this technology works when the sound source is in direct line of sight of a microphone array. In other words, the microphone array is placed in the same elastic media as the source under interrogation, but not blocked from the sound source to each of the microphones within the microphone array.

Triangulation has been employed in sound source localization by deploying a minimum of three microphones in a space. Triangulation will point at the location of source when this source radiates acoustic energy to the surrounding medium. However, triangulation by itself using three microphones may not be able to determine where exactly a sound source is when the microphones and source are not on the same plane. In other words, triangulation using three microphones can only locate a sound source in Two-Dimensional (2D) space, not Three-Dimensional (3D) space. To locate a sound source in 3D space, a minimum of four or more microphones are needed.

Many engineering diagnostic activities are related to sound source localization in 2D or 3D spaces, characterization of the nature of the source in terms of its frequency content, and discrimination of the source among a plurality or other potential sources. Those technologies are counting on the fact that the sound radiation reaches pressure transduces without any blockage or partition between the source (s) and the pressure transducers; therefore, time delays could be accounted for. While trial-and-error approaches may help determine a location of a potential sound source behind a solid partition, vast knowledge of the target structure and its components are typically relied on to obtain accurate locations of the sound source(s).

Therefore, a need exists to develop a novel technology to determine a location of a sound source within a solid enclosure. Sound source localization is typically conducted in open spaces so that the line of sight is not blocked among individual sensors. The disclosure enables one to effectively "see" through a solid enclosure to locate a sound source inside. Potential applications could include but would not limit to rescue operations to locate people trapped underneath or inside wreckages, determination of root causes of noise and vibration of an operating machine, gathering intelligence for military and security purposes, etc.

Thus, there is a need for a new system and method for enabling one to see through a solid enclosure to locate sound sources hiding behind or inside an enclosure.

BRIEF DESCRIPTION

According to the disclosure a system for locating a sound source includes at least four emitter/receiver pairs, each emitter/receiver pair of the at least four emitter/receiver pairs including a laser emitter and a receiver external to an enclosed structure. The laser directs a laser beam onto a respective reflector surface location on an outer surface of the structure, the respective reflector surface location being caused to vibrate due to sound waves generated from a sound source at a sound source location within the enclosed structure. The receiver receives vibrational signals from the laser beam on the surface at the respective reflector surface location and converting the vibrational signals to acoustic signals. A processor coupled to the at least four emitter/receiver pairs for utilizing the acoustic signals to determine a time difference of arrival of the sound waves to the respective reflector surface locations to determine the sound source location within the enclosed structure based on the time difference of arrivals.

Also according to the disclosure, a method of locating a sound source in an enclosed structure includes measuring vibration signals from at least four reflector surfaces on an outer surface of the enclosed structure with at least four lasers corresponding to each of the at least four reflector surface, recording the vibration signals and converting the vibration signals into acoustic signals with at least four receivers corresponding to each of the at least four reflector surfaces, estimating a time difference of arrival of sound waves at each of the four reflector surfaces, and locating a sound source in the enclosed structure based on the time difference of arrivals of sound waves from the sound source to each of the at least four reflector surfaces.

BRIEF DESCRIPTION OF THE DRAWINGS

FIG. 9 illustrates an exemplary graphical result of sound source localization after estimating time difference of arrival for sensor pairs according to the coordinates of FIG. 8A;

FIGS. 10A through 10C illustrate exemplary results of sound source localization using the exemplary array of FIG. 7.

DETAILED DESCRIPTION

Figure 1:
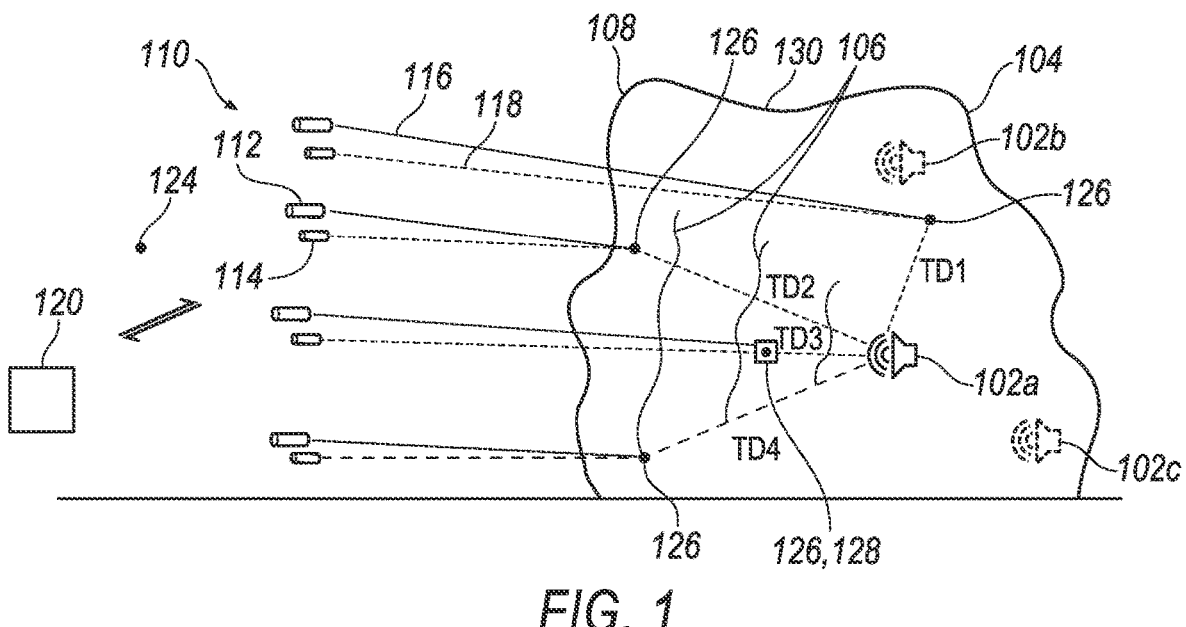
FIG. 1 illustrates an exemplary system for locating sound sources in an enclosed structure.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

This disclosure relates generally to a novel technology to acoustically "see" through a solid enclosure such as an arbitrarily shaped enclosure made of arbitrary solid materials such as an engine compartment, a passenger cabin, a building, and the like, to locate a sound source inside the enclosure. The disclosure includes four major components which will be described in detail below: 1) laser emitters to measure vibration signals on a surface of a solid structure; 2) a configuration of the laser sensors to maximize the signal to noise ratio in data acquisition; 3) algorithms to decode and convert vibrational signals to acoustic signals; and 4) sonic detection and ranging (SODAR) algorithms that utilize the acoustic signals to locate the sound sources.

Sound is a physical manifestation of time-dependent pressure fluctuations occurring around the static pressure of compressible fluids, which can be air or water. Vibrating elastic structures are capable of radiating sound into the atmosphere. As an example, a vibrating structure such as a steel beam struck by a hammer radiates sound since some portions of the vibration fluctuations of the flexural waves on the surface of the beam will transmit energy into the air as sound waves. The reverse is also possible. In other words, an incident wave impacting an elastic structure may make this structure vibrate. Depending on the characteristics of the specific elastic structure and the nature of the excitation waves (frequency content, intensity, etc.) some of the acoustic energy may reflect off an inner surface of the structure, some other portions of the energy will be converted to heat within the structure's mass and boundary, and some acoustic energy will transmit through the surface and travel outside of the structure.

It follows that when sound sources stationed inside or behind solid structures radiate acoustic energy to a surrounding media, some portions of this acoustic energy may transmit through the walls of the enclosure and may reach one's ears or a sound sensor on the other side. The walls of this enclosure react when acoustic energy passes through the structure. That reaction effect results in vibration: vibration that carries information related to the nature of the sound source responsible for the action such as sound amplitude and frequency. The vibration information is used in this disclosure for sound source localization.

According to the disclosure, emitter/receiver pairs are positioned to direct laser beams toward an enclosed structure. Each emitter/receiver pair directs a laser beam from the emitter, toward its own specific and known location of an outer surface of an enclosed structure, and reflected back to the receiver of the emitter/receiver pair. Reflection is due to a reflector surface at the known location. The reflector surface may be an outer surface of the enclosed structure or the reflector surface may be a separate reflector hard mounted to the outer surface, and when noise is generated within the enclosed structure the noise propagates internally to its inner surfaces, causing walls of the enclosed structure to vibrate. Sound propagation through the walls carries to the reflector surface, thereby causing the walls to vibrate (and the reflector surface)—having amplitudes and frequencies that transfer to the reflector surface. Vibration of the reflector surface ensues, and laser light emitted from the emitter is reflected in a fashion that is received at the corresponding receiver. Due to the known time delay of sound waves in an elastic medium (i.e., air), sound from the sound source includes sound information in the form of vibration frequencies and amplitudes that translate to signals reflected from the reflector surface to the receiver, and ultimately from the receiver to a computing device as an electrical signal containing such information. In addition, however, the signals inherently also include the time delay from the sound source to internal wall where the reflector surface is located. The time delay itself is not discerned on its own via one pair of emitter/receiver pairs, but in combination with other emitter/receiver pairs that are positioned at other locations on the outer surface of the enclosure, a time differential from the sound source to each respective location is evaluated so that the location of the sound source within the structure is determined.

Thus, according to the disclosure, at least four emitter/receiver pairs are used in conjunction with at least four reflector surfaces at known locations on the outer surface of the enclosure. Each emitter/receiver thereby is directed toward its own respective reflector surface location. As indicated, the reflector surface locations are known locations in 3D space, which can be determined via, for instance, a calibration step where the positions are determined with respect to a common (and perhaps arbitrary) origin that is external to the enclosed structure. With knowledge of the at least four emitter/receiver pairs, each provides its own vibrational information which can be assessed for sound, as well as slight variations in TDOA at each of the known reflector surface locations. That is, for a given location of a sound source in an enclosed structure, and due to the generally constant speed of sound within the structure, time variances at the reflector surface locations occur due to the differing distances from the sound source to the reflector surface locations. Such time differences are discernable when all of the at least four receivers transmit their signals to the computer system concurrently, thereby providing an additional element of information that is used, according to the disclosure, to locate the sound source within the enclosed structure.

Thus, the disclosure includes a system and method for sound source localization within a structure, with known and even unknown wave speeds, even when the line of sight is blocked from the sound source to individual receiving sensors. The receiving sensors feed the signals to SODAR triangulation algorithms, which include the functionality to enhance signal-to-noise ratio (SNR), to locate sound sources inside a solid enclosure.

As illustrated in FIG. 1, a system 100 for locating a sound source 102 in an enclosed structure 104 is illustrated. Sound source 102 may include a single sound source or multiple sound sources. A first sound source 102A is be positioned at a first position in 3D space within enclosed structure. In instances with multiple sound sources, a second source 102B, 102C may be positioned at a second position in enclosed structure 104. Enclosed structure 104 may be made of a variety of materials, such as wood, plastic, or brick, as examples, and enclosed structure 104 may be of various sizes and shapes. A surface 108 of enclosed structure 104 may be flat, or may include various indentations and angles. Examples of sound sources 102 in enclosed structures 104 may include noises in an engine compartment or individuals inside a building or trapped inside wreckages. A plurality of sound waves 106 are emitted from sound source 102 and may expand spherically at a constant rate. Enclosed structure 104 may be substantially filled with air such that sound waves 106 emitted from sound source 102 substantially travel through air towards surface 108 of structure 104. For example, structure 104 may be a building with empty rooms. On the other hand, structure 104 may be substantially made of materials denser than air. For example, structure 104 may be a pile of rock rubble or an engine block. In examples, sound waves 106 may substantially travel through materials denser than air such as rock, aluminum, steel, etc. In an elastic media such as air, sound waves 106 are longitudinal or compressional waves. Different types of waves travel at different speeds and at different frequencies. System 100 allows various waves with different speeds or frequencies to be measured and recorded.

System 100 includes a plurality of sensors, or emitter/receiver pairs, 110 positioned external to enclosed structure 104. A minimum of four sensors 110 are used to determine x, y, z, coordinates of sound source 102, but additional sensors 110 may be utilized, and an optimal system 100 may utilize six sensors 110. Sensors 110 are positioned relative to an origin position 124 such that the position of each sensor 110 with respect to the origin position 124 does not change. If the origin position 124 moves, each sensor 110 moves relative to the origin position 124. Each sensor 110 includes an emitter, or laser, 112 and a corresponding receiver 114.

Laser 112 acts as the major measurement agent, producing a visible laser beam 116 directed to a specific or known reflector surface location 126 on outer surface 108 of structure 104. Reflector surface location 126 may be located at any point or on any external facing side of surface 108. In one sense, the reflector may be reflective such as in a mirror. In another sense the reflector may be any surface such as a brick, wooden, or metal surface that receives laser light and due to the nature of laser light is reflected. In one example, emitter may be laser light from laser 112 and may be a diode laser, and is utilized to measure the vibration information on surface 108 of enclosed structure 104. Receiver 114 may be a photo diode receiver for converting the vibration information to acoustic information. Acoustic signals 118 from the receiver 114 are provided to a computer 120 for processing and locating sound source 102. Each laser 112 and receiver 114 of sensor 110 are directed to a distinct point 126 on surface 108 of structure 104. Specific location, or distinct point, 126 of surface 108 is a reflector surface. Reflector surface receives beam 116 from laser 112 and reflects light (and thus, vibrational signals) back to receiver 114. Reflector surface may be surface 108 of structure 104 or may be a separate reflector 128 which is hard mounted to surface 108.

Figure 2:
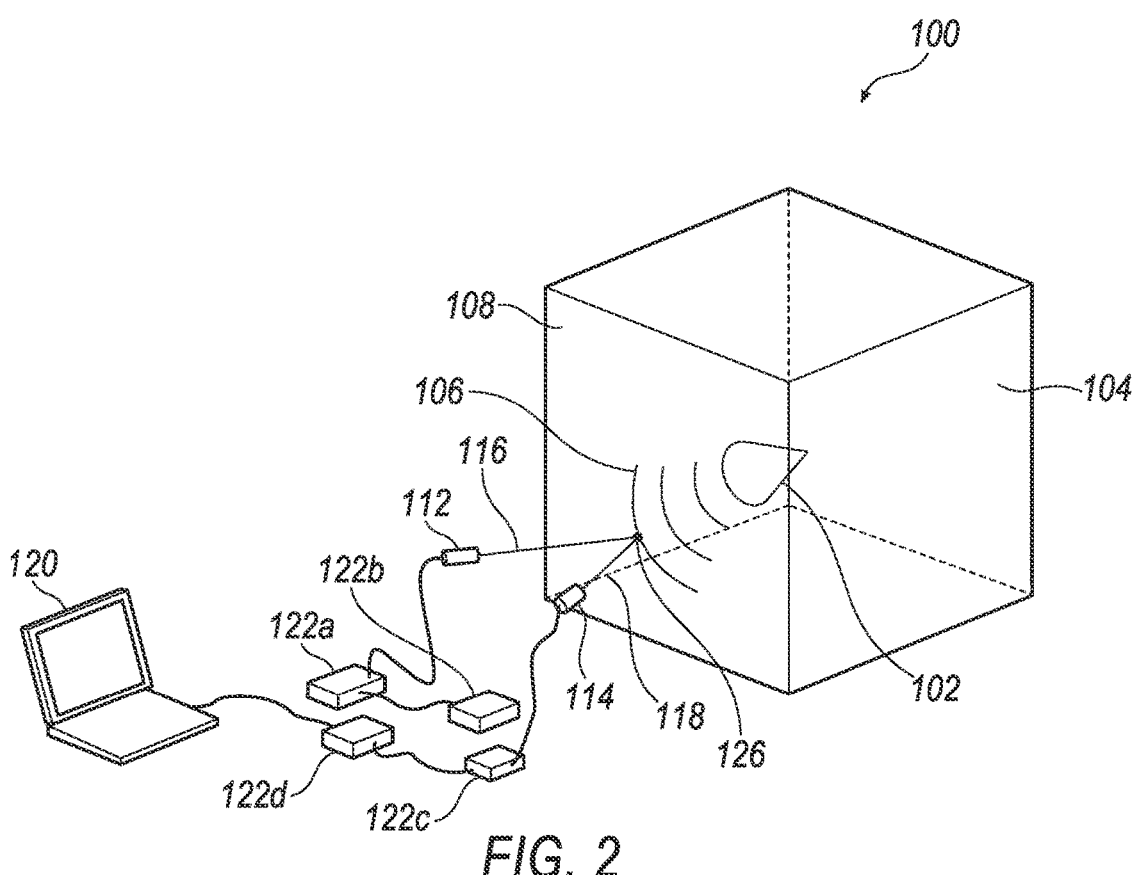
FIG. 2 illustrates an exemplary system for locating sound sources in an enclosed structure.

An exemplary system is illustrated in FIG. 2 which includes enclosed structure 102 as a cubic solid enclosure. Sound source 104 is positioned in enclosure structure 102 facing outer surface 108 such that sound waves 106 from sound source 104 are emitted and travel toward surface 108. System 100 is illustrated as having one emitter/receiver pair 110 to better illustrate the interaction between laser 112 and receiver 114 of pair 110, however a minimum of four sensors are used in system 100. Laser 112 is directed toward surface 108 such that laser bean 116 produces a visible beam on surface 108. When noise is generated within structure 104, noise propagates internally as sound waves 106 internally to an inner surface 130 of structure 104. Sound waves 106 traveling to inner surface 130 causes walls of structure 104 to vibrate. Sound propagation through walls carries to reflector surface 126 locations, thereby causing walls 108 and reflector surface 126 to vibrate, having amplitudes and frequencies that transfer from sound waves 106 to inner surface 130 and then to reflector surface locations 126.

Sound waves 106 produce vibrations on surface 108 of structure 102 which are visible and measurable by laser beam 116 emitted to surface 108 at reflector surface locations 126 by emitter 112 and is reflected in a fashion that is received at corresponding receiver 114. Receiver 114 is directed to surface 108 where laser beam 116 is directed such that receiver 114 may convert vibration information from laser beam 116 to acoustic signals 118 for processing. Sensor 110 is connected to a computer or computing device, 120 for data processing via additional electronic components 122a, 122b, 122c, 122d. For example, additional electronic components 122 may include a laser driver 122a for operating laser 112, an amplifier 122c for adjusting acoustic signals 118 for better processing, and a power supply 122b for providing power to sensor 110. Computer 120 may include data acquisition modules, signal processing hardware and software applications.

Due to time delay of sound waves in an elastic medium, sound from sound source 102 including sound information in the form of vibration frequencies and amplitudes that translate to signals reflected at reflector surface locations 126 to receiver 114, and ultimately to computing device 120 as an electrical signal containing information. In addition, the signals inherently include time delay from sound source 102 to internal wall 130 where reflector surface 126 is located. For example, a time delay from sound source 102 to a first reflector surface location 126A may have a signal which inherently includes the TDOA TD1 associated with the distance from sound source 102 to first reflector surface location 126A. This TD1 is different from the TDOA TD2 associated with the signal received at a second reflector surface location 126B based on the distance from sound source 102 to second reflector surface 126B. The time delay of each signal itself is not discernable on its own via one receiver/emitter pair 110, but in combination with other pairs 110 that are positioned at other locations on outer surface 108 of enclosure 104, the TDOA from sound source 102 to each respective location 126 is evaluated and the location of sound source 102 within structure 104 is determined.

Referring to FIGS. 1 and 2, the major measurement agent is laser beam 116 emitted from laser 112. Laser 112 is a low power visible red diode laser, with wavelength approximately 650 nanometers. When laser 112 is excited with appropriate current levels, laser beam 116 is emitted by grain medium and laser cavity of the diode. Thus, laser 112 may include the use of laser driver 122a to provide correct currents for bias and modulation of laser 112. Laser driver 122a may be a standard low power diode laser driver circuit in continuous wave or constant current control which provides a stable current supply to laser 112. For example, a diode laser driver may use a LM317L-N positive adjustable voltage regulation in a precision current limited configuration. The voltage regulator and its external circuitry supply stable current to the diode laser. The advantage of this CW current injection method for the diode laser is about its simplicity since a photodiode feedback loop or monitor photodiode is not included in optical power output control. The diode laser may also have a suitable heat sink. A solid or hallow copper diode holder are the preferable options for keeping the diode laser from overheating. Additionally, as light beams emitted by lasers may be highly divergent in nature and form ellipses in near and far fields, lenses, optic fibers, or collimators may be used to alleviate laser beam 116 divergence by optical correction to ensure accuracy with laser 112 use. For example, a broadband (400-700 nm), anti-reflective coating, glass aspheric collimation lens may be used.

Receiver 114 may be a PIN photodiode receiver which is a semiconductor designed as a light detector that generates a current or voltage when the PN junction is irradiated by light. Laser beam 116 emitted by laser 112 is reflected by surface 108 of enclosed structure 102 and is captured by receiver 114. Receiver 114, as a PIN photodiode receiver, may generate a small flux of charge carriers which may include some form of monitoring amplification such as an operational amplifier 122c or a laser vibrometer. A current-to-voltage converter is a simple way to isolate the load voltage swing from the photodiode capacitance for improved bandwidth. In general, an operational amplifier in its transimpedance amplifier (TIA) configuration is a current-to-voltage converter. This TIA configuration of converter is preferred over other amplifications since the voltage output has better linear response with respect to input current, offset, and bandwidth, however other amplification devices may be used. Further stabilization and improvement of bandwidth of a TIA may also be achieved by including a bypass capacitor.

Aligning a reflected laser beam to a photoreceptor may include various challenges due to a target structure being not fixed. Thus, while an individual laser and an individual photoreceptor may be used in their own self-standing unit, employing diode lasers with integrated photodiodes and fiber-optic circularization technology is preferred to mitigate misalignment issues which may occur with individual units.

After amplification, a filter 122 or multiple filters are included for optimal performance of the data acquisition blocks. Signal filtering is used to block dc current, filter out frequencies below the lower limit for acoustic requirements, and avoid aliasing by limiting frequencies beyond an upper limit for vibroacoustic applications. To accomplish these, a high-pass filter and a low-pass filter are used in succession, which creates a band-pass filter. Low-pass and high-pass filters are included since these filters in cascade arrangement block low frequencies, including the dc component, and high frequencies from going into the NI DAQ inputs. A dc component should be prevented from going into the DAQ since it can saturate the system and cause erroneous readings. High frequencies should be filtered since it is the recommended way to effectively prevent aliasing during sampling and holding. The category of a filter corresponds to its order. For a Butterworth filter (low-, high-, and band-pass), the slope is 20n dB/decade where n is the filter order. Therefore, a ±60 dB/decade filter is of $3^{rd}$ order. Noticeable advantages of the Butterworth filters are their gain that is very close to 1 (0 dB) and flat response in the pass band. The output of amplifier 122c and filter may be inputted into a NI DAQ module 122d to provide quality multifunction I/O to perform electrical measurements which then goes to computer 120 for processing.

Figure 3:
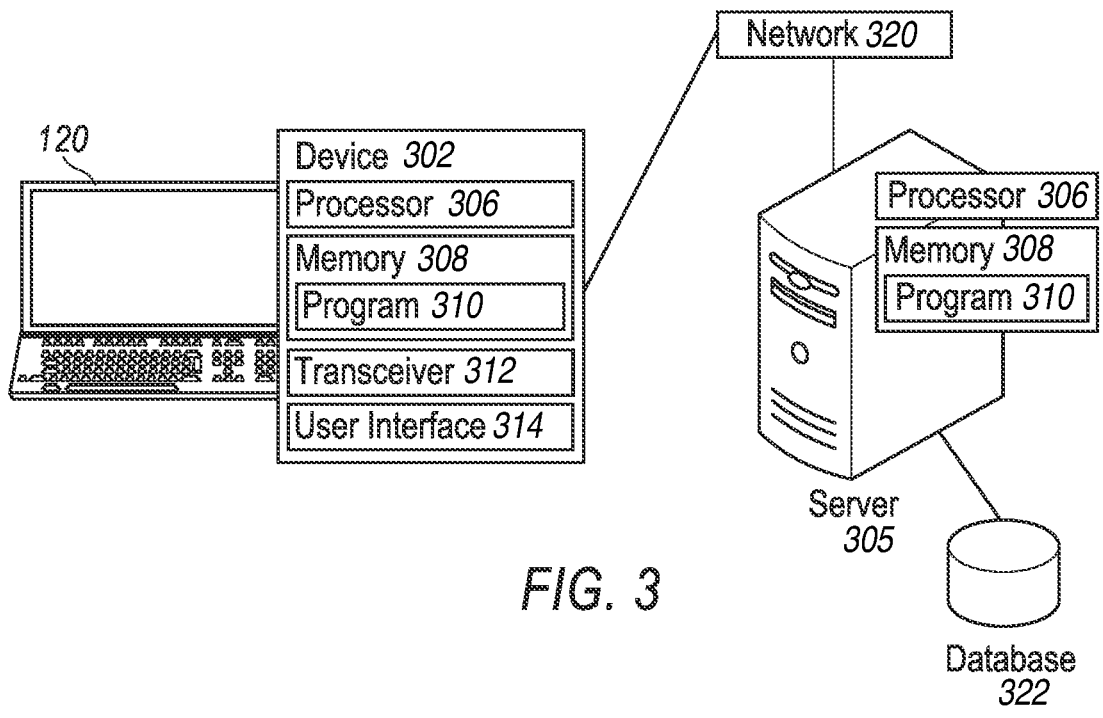
FIG. 3 illustrates an exemplary network for processing sound source data.

FIG. 3 illustrates exemplary computer 120 shown in FIGS. 1 and 2 which may be coupled with electronic components 122. General interactions between various disclosed system elements are shown, and may include computer 120 and electronics 122 having operation in system 100. System 100 incorporates exemplary arrangements that operate as computer 120 as disclosed herein. While exemplary system 100 is shown in FIGS. 1 and 2, the exemplary components illustrated in FIGS. 1 and 2 are not intended to be limiting, may be optional, and are not essential to any other component or portion of system 100.

Computer 120 may include one or more of devices 302, server 305, processor 306, memory 308, program 310, transceiver 312, user interface 314, network 320, and database 322. Device 302 may include any or all of devices 302 (e.g., a desktop, laptop, or tablet computer). Processor 306 may include a hardware processor that executes program 310 to provide any or all of the operations described herein.

Connections may be any wired or wireless connections between two or more endpoints (e.g., devices or systems), for example, to facilitate transfer of information. The connection may include a local area network, for example, to communicatively connect the device 302 with network 320. The connection may include a wide area network connection, for example, to communicatively connect server 305 with network 320. The connection may include a wireless connection, e.g., radiofrequency (RF), near field communication (NFC), Bluetooth communication, Wi-Fi, or a wired connection, for example, to communicatively connect the device 302.

Any portion of the system may include a computing system and/or device that includes a processor 306 and a memory 308. Computing systems and/or devices generally include computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, etc. The system may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, the computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing systems and/or devices may include, without limitation, mobile devices, cellular phones, smart-phones, super-phones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Further, processors such as processor 306 receive instructions from memories such as memory 308 or database 322 and execute the instructions to provide the operations herein, thereby performing one or more processes, including one or more of the processes described herein. Such instructions and other information may be stored and transmitted using a variety of computer-readable mediums (e.g., memory 308 or database 322). Processors such as processor 106 may include any computer hardware or combination of computer hardware that is configured to accomplish the purpose of the devices, systems, operations, and processes described herein. For example, the processor 306 may be any one of, but not limited to single, dual, triple, or quad core processors (on one single chip), graphics processing units, and visual processing hardware.

A memory such as memory 308 or database 322 may include, in general, any computer-readable medium (also referred to as a processor-readable medium) that may include any non-transitory (e.g., tangible) medium that provides instructions that may be read by a computer. Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other information stores (e.g., memory 308 and database 322) described herein may generally include various kinds of mechanisms for storing, providing, accessing, and retrieving various kinds of information, including a hierarchical database, a set of files in a file system, an application database in a proprietary format, a relational database management system (RDBMS), etc. Each such information may generally be included within to a computing system and/or device employing a computer operating system such as one of those mentioned above, and/or accessed via a network or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

Figure 4:
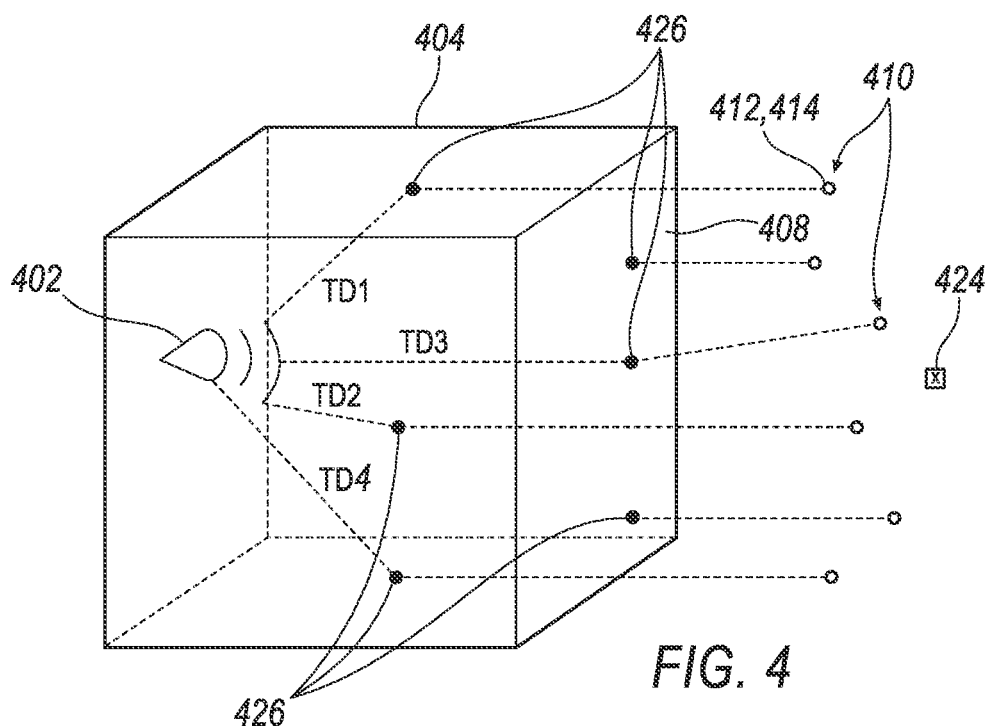
FIG. 4 illustrates an exemplary system for locating sound sources in an enclosed structure.
Figure 5:
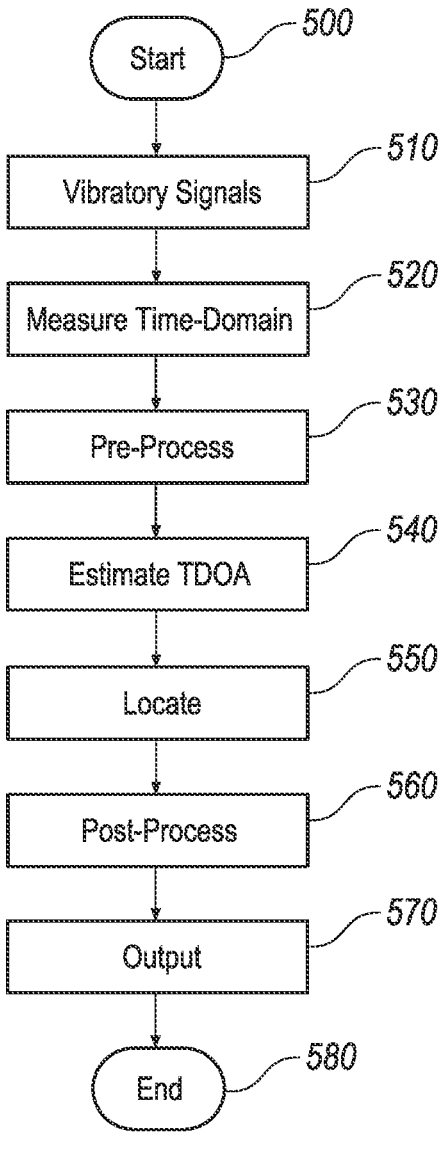
FIG. 5 illustrates an exemplary method for locating sound sources in an enclosed structure.

FIG. 4 illustrates an exemplary set-up of an enclosed structure in which a source sound is positioned and located utilizing the method of FIG. 5. In the illustrated example, enclosed structure is a cubic solid enclosure 400 made of plexiglass with dimensions $1 \times 1 \times 1$ m$^3$. A sound source such as an acoustic or a human speaker 402 is positioned inside enclosure 400 at arbitrarily selected locations through testing. Speaker 402 emits a variety of acoustic signals at low amplitudes from signals with repetitive pulsating noise to constant sound pressure levels. An array of six sensors 410 are positioned external to enclosure 404 to measure minute surface vibrations of enclosure 404 surface 408 and subsequently, convert the vibrations into acoustic signals through band-pass filters and fast Fourier transform algorithms together with cross-correlations and triangulations to locate speaker 402 in enclosure 404. To obtain the Cartesian coordinates of sound source inside solid enclosure, the method will include measuring the normal components of surface vibrations on a curved, 3D surface or measuring vibration signals on two adjacent surfaces of enclosure, combining with triangulation information, and resolving for the location in 3D of sound source.

The plurality of sensors 410 are positioned relative to one another such that each of sensors 410 remain in a position relative to a Cartesian coordinate system origin 424. If the origin 424 is changed, the sensors 410 move relative to origin 424. Thus, emitter/receiver pair 410 are used in conjunction with corresponding reflector surfaces 426 for each pair 410 on outer surface 408 of structure 404. As indicated, reflector surfaces 426 are known locations in three-space, which can be determined via for instance, a calibration step where position are determined relative to a common (and perhaps arbitrary) origin point 426 that is external to structure 404.

At 510, each of sensors 410 are positioned to acquire signals from distinct points 426 on surface 408 of enclosure 402. The speed of sound from sound source 402 to points 426 are each different based on distance from source 402 to point 426, as illustrated by time difference TD1, TD2, TD3, and TD4. At 520, sensors 410 measure the time-domain signals of the sound pressure by using the laser and receivers illustrated in FIGS. 1 and 2 to record the vibration signals from the sound pressure on surface 408 of structure 404 at each of points 426. With knowledge of emitter/receiver pairs 410, each provides its own vibrational information which can be assessed for sound, as well as slight variations in TDOA at each of known reflector surface locations 426. That is, for a given location of sound source 402 in enclosed structure 404, and due to the generally constant speed of sound within the structure 404, time variances TD1, TD2, TD3, TD4 at reflector surface locations 426 occur due to the differing distances from sound source 402 to reflector surface locations 426. Such time differences are discernable when all of at least four receivers 414 transmit their signals to computer system 420 concurrently, thereby providing an additional element of information that is used, according to the disclosure, to locate sound source 402 within enclosed structure 404. At 530, the measured signals are preprocessed to enhance the signal-to-noise ratios in all of the sensor channels. This may include processing through amplification and filtering of signals as described in FIG. 2. Time-sequence data may be subject to denoising and transformation from time- to frequency-domain via fast Fourier transformation at this step. This is for understanding the cleanliness of the data and the level of signal versus background noise. At 540, the TDOAs TD1, TD2, TD3, TD4 among all signals is estimated. The time for a sound wave 406 emitted from sound source 402 to points 426 on surface 408 of structure 404 are different based on distance from sound source 402 to point 426. Thus, the vibratory signals on surface 408 of structure 404 at each point 426 are different based on the distance sound wave 406 traveled. The TDOA of each point is measurable based on those differences. At 550, the TDOA may be triangulated to determine location of sound source based on the TDOA results. At 560, results are postprocessed to minimize errors in localization of sound source. At 570, the localization results are output.

Exemplary Simulations of Method

The disclosure includes mathematical equations employed in triangulation for cases of known and unknown wave speeds. It also includes the TDOA for pairs of receiving sensors in arrays of two, three, and six sensors and applying those TDOA estimations to determine sound source localization in numerical simulation. The results of numerical simulation are presented for cases of triangular arrays with three and six sensors for known and unknown wave speeds, respectively.

Triangulation is the preferable mathematical modeling method for sound source localization in isotropic and aniso-tropic homogeneous structures, with flat or irregular surfaces in 2D, and 3D space in air or water. In triangulation, an array of three receiving sensors arranged in a triangular pattern is used as the basics for determining the coordinates of a sound source in 2D space, after performing a series of multiple mathematical manipulations of the acquired signals by the receiving sensors. The advantage in the implementation of the triangulation method is the fact that it yields an exact solution for any array configuration of those three sensors as long as a triangular patter is maintained.

Figure 6A:
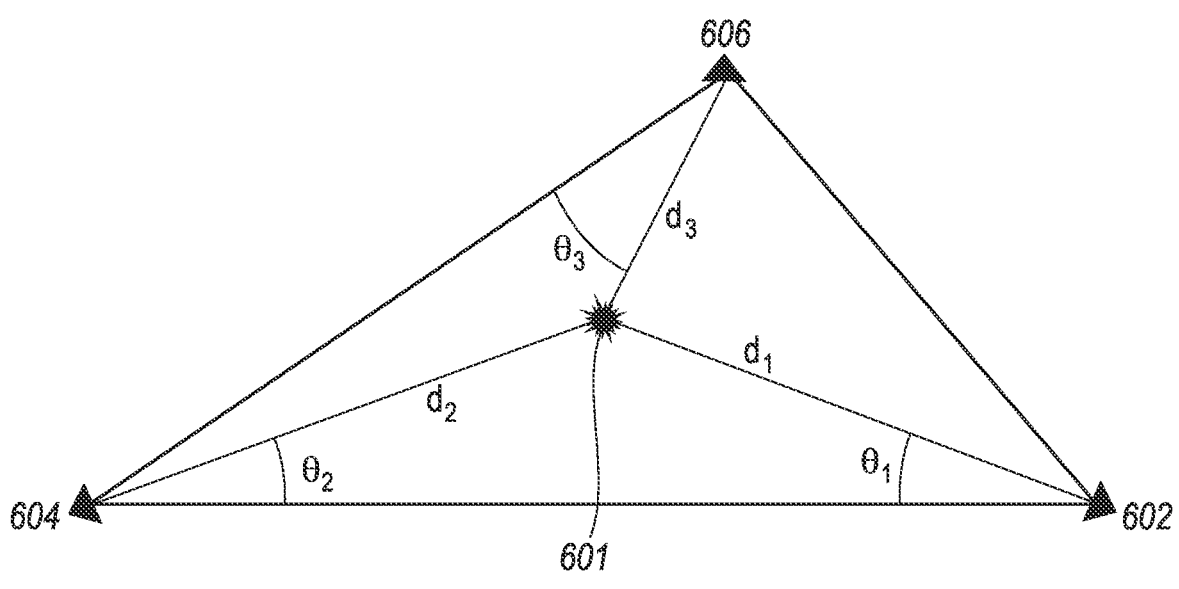
FIG. 6A illustrates an exemplary array of receiving sensors forming the basis of triangulation of sound source localization.

Referring to FIG. 6A, the method for determining the travel distances $d_i$ from the point source 601 to any of the three receiving sensors 602, 604, 606 starts by estimating the TDOA $\Delta t_{ij}$ between any pairs of sensors. It follows that triangulation poses two challenges, as follows: (a) the speed of propagating wave in the media or structure is known a priori, or (b) the propagating wave speed is unknown.

The TDOA between any pairs of sensors is defined by $\Delta t_{ij}=t_i-t_j=(T_i-T_0)-(T_j-T_0)=\Delta T_{ij}$, where $t_i$ and $t_j$ represent the travel times from point source 601 to the receiving sensors $S_i$ and $S_j$, respectively. $T_i$ and $T_j$ are the measured clock or detection times, and $T_0$ is the starting clock time. Noting that for one to estimate the travel time $t_i$ or $t_j$, the time of emission $t_0$ (not represented) from the sound source should be known, invariably. In most practical cases, this to cannot be determined or estimated to any usable degree of accuracy; however, neither $t_0$ nor $T_0$ is necessary for the estimation of the traveled distances $d_i$, so long as $\Delta t_{ij}$ and $\Delta T_{ij}$ are known.

Therefore, $d_i=c\times t_i$, where c is the wave speed (in air at 20° C., the sound wave travels at ~343.6 ms$^{-1}$), can be replaced by, $\Delta d_{ij}=c\times\Delta t_{ij}$, or by, $\Delta d_{ij}=c\times\Delta T_{ij}$. Essentially, $$c\times\Delta T_{21}=\Delta d_{21}=d_2-d_1;\ c\times\Delta T_{31}=\Delta d_{31}=d_3-d_1.$$

Figure 6B:
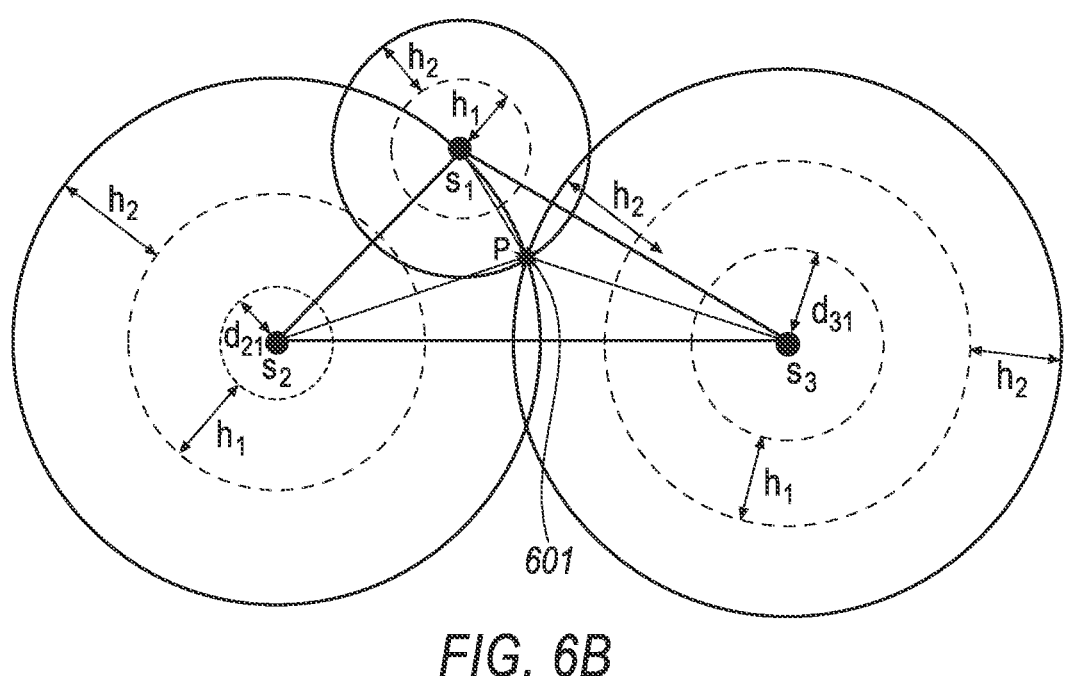
FIG. 6B illustrates an exemplary graph for estimating location of a sound source based on triangulation and time difference of arrival between sensor pairs of FIG. 6A.

Illustrated in FIG. 6B and employing those equations, the procedure for estimating the location of the sound source 601 includes drawing two circles with radii $\Delta d_{21}$ and $\Delta d_{31}$ whose centers are the sensors' locations $S_2$ and $S_3$, respec-tively, increasing the radii of the two circles by the arbitrary selected $h_1$ distance, drawing a third circle of radius $h_1$ with center at sensor location $S_1$, and if those three circles do not intersect each other at one point, then all three circles are increased by another arbitrary distance $h_2$. If the three new larger circles do not intersect one another at a common point, the process of adding distance to the radii of the circles continues until the three circles intersect each other at a common point. This common intersecting point is the source point location.

This triangulation process is used with only three receiving sensors. When a numerically simulated source localization process is performed in two orthogonal walls of the cubic enclosure for a given sound source, a spherical location region is developed. The radius of each spherical region represents the maximum distance from the actual location of the source to its estimated location. The accuracy of the locating method describe above is increased by adding more sensors to the triangular scheme. In other words, with four sensors, one could construct two triangles and increase the number of pairs of $\Delta T_{ij}$ from two to three. Therefore, with a six-sensor array, one could have at least five triangular clusters.

Figure 7:
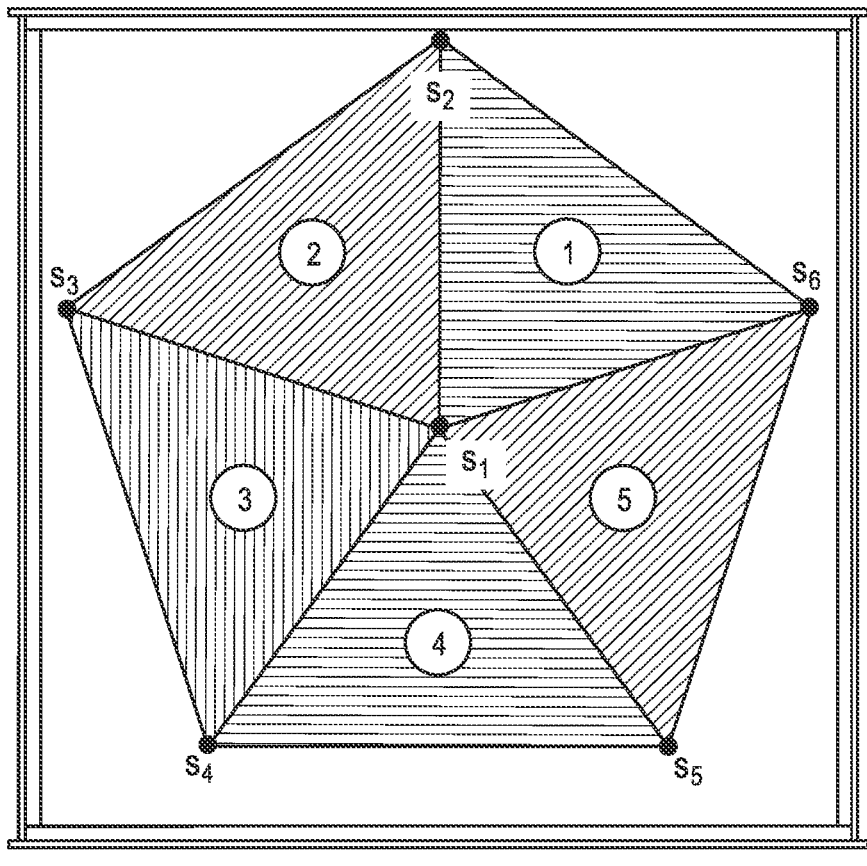
FIG. 7 illustrates an exemplary pentagonal array of receiving sensors for sound source localization.
Figure 8A:
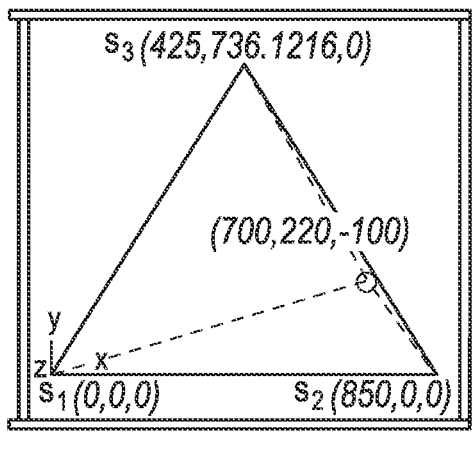
FIGS. 8A through 8D illustrate exemplary coordinates of a sensor pattern array and spatial location of a sound source inside a structure.
Figure 8B:
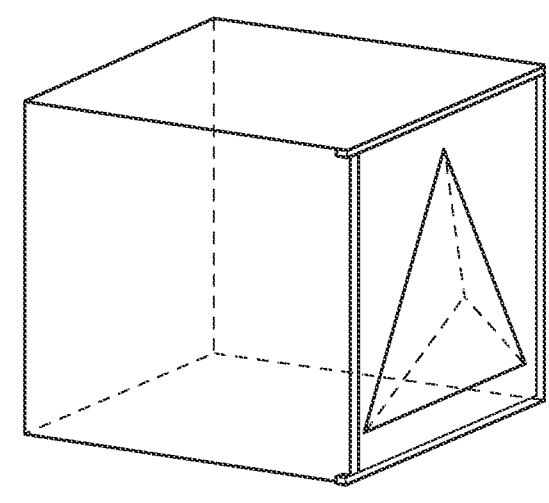
Figure 8C:
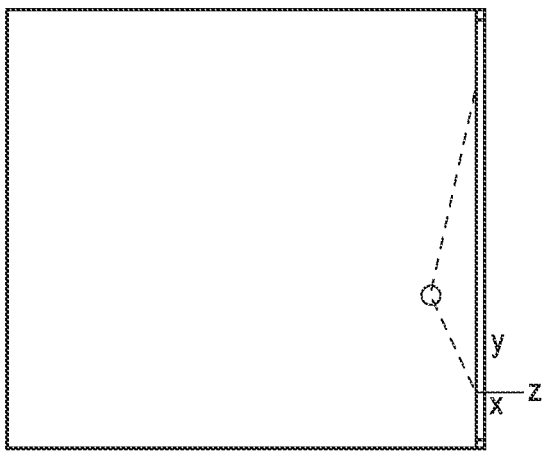
Figure 8D:
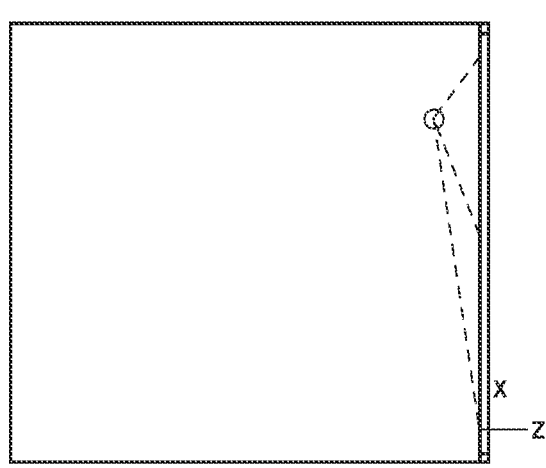

In examples, a sound source is positioned at four spatial locations inside a CAD boundary structure of dimensions (1×1×1 m$^3$). The distances from the sound source to each of the three sensor locations $S_1$, $S_2$, and $S_3$ are determined by the Pythagorean theorem. TDOAs are estimated, and triangulation applied. 2D location coordinates (x and y) are obtained from one side of the structure first. The process is repeated for a second partition of the structure that is adjacent to the initially selected one. With two pairs of 2D coordinates, a spatial position of the sound source is determined, and spherical radial error estimated. For the case of unknown wave speeds, a final simulation trail is conducted with a six-sensor array arranged in a pentagonal pattern as illustrated in FIG. 7. In this simulation, a time-domain signal is captured by a one the laser microphones. This signal is analyzed in frequency domain and denoised. Five copies of the post-processed signal are obtained. Each of those copies is time-shifted a pre-determined number of samples n, so TDOAs are created deliberately for this simulation. A short Scilab sample code helps adding the desired time-shift to a sequence of data taken in time domain.

In an example with known wave speeds, A virtual sound source P was positioned at coordinates (700, 220, −100) with respect to the acquiring sensor $S_1$ of the triangular array of three receiving sensors as illustrated in FIG. 8. To determine the distance between the sound source (x, y, z) to each of the three acquiring sensor location $S_1$ $(x_1, y_1)$, $S_2$ $(x_2, y_2)$, and $S_3$ $(x_3, y_3)$; the Pythagorean theorem is used. Once the distance from the sound source to each of the receiving sensors is available, one can solve for time of flight, namely, $t=d/v$, taking v as the wave speed for sound in air as 343.150 m×s$^{-1}$ or 343150 mm×s$^{-1}$. With all three flight times determined, $\Delta t_{ij}$ can be estimated, and the process for sound source localization for known wave speed as described above can be used. The graphical results of the sound source simulated localization process of FIG. 8 are illustrated in FIG. 9. An error function for the process may be used to identify potential error percentage in localization using $E(x_0, y_0)=[t_{23}(d_1-d_2)-t_{12}(d_2-d_1)]^2+[t_{31}(d_2-d_3)-t_{23}(d_3-d_1)]^2+[t_{12}(d_3-d_1)-t_{31}(d_1-d_2)]^2$. For the results of the example illustrated in FIGS. 8 and 9, the calculated error is 3.87%.

With the positions of the sound source estimated in 2D for two adjacent walls of the cubic structured, one can estimate the location in 3D of a sound source inside the cubic structure by projecting two perpendicular (with respect to their respective walls) lines from each of the two estimated locations into the structure. The intersection or the minimum distance between those two lines indicates the location in 3D of the sound source inside the cube. Ideally, the locations of the two sound sources (virtual and estimated) should coincide. However, errors in the estimations are expected, and maximum estimated distance between the two sound locations is achieved. Using this maximum distance as the radius of a sphere whose center is the location of the reference virtual sound source, one can obtain an error region for the location of the source inside the structure.

In another example, the functionality of sound source localization using SODAR algorithm is illustrated, in a case of unknown wave speed. A six-sensor array arranged in a pentagonal pattern as illustrated in FIG. 7 is utilized in this example. The input data consists of 5 seconds of a time-domain signal captured by laser microphones. This signal is analyzed in frequency domain and denoised. Five copies of the post-processed signal are obtained. Each of those copies is time-shifted, so TDOAs are created on purpose for the source to be positioned at the center of the array and about 500 mm way from each of the interrogated walls. The simulation results for the sound source localization with the triangulation method for two pentagonal arrays of six receiving sensors each are displayed in FIGS. 10A-10C. Arrays are positioned on two adjacent walls of the cubic structure for the case of unknown wave speed. The source is positioned in the center of the cubic structure and is accurately located in 3D by the intersection of two projecting lines, which are orthogonal to their respective panels. The source is also located accurately in 2D at the geometrical center of each array positioned in each the two adjacent walls of the structure.

Assume that a sound source P and three sensors (Si, i=1, 2, 3) are on the same plane, whose coordinates are given, respectively, by (x, y, z), (x1, y1, z), (x2, y2, z), and (x3, y3, z). Using triangular relationships, we have that $d_1 \sin \theta_1 = d_2 \sin \theta_2$; $d_1 \cos \theta_1 + d_2 \cos \theta_2 = \sqrt{(x_1-x_2)^2+(y_1-y_2)^2} = D_{12}$; $d_i = \sqrt{(x_i-x)^2+(y_i-y)^2}$; and $d_i = \sqrt{(x_i-x)^2+(y_i-y)^2} = ct_i$. Cartesian coordinates of the source can be determined by solving the following two simultaneous equations: $\sqrt{(x-x_2)^2+(y-y_2)^2} = \sqrt{(x-x_1)^2+(y-y_1)^2}+c\Delta t_{12}$ and $\sqrt{(x-x_3)^2+(y-y_3)^2} = \sqrt{(x-x_1)^2+(y-y_1)^2}+c\Delta t_{13}$, where c indicates the speed of sound (340.29 ms$^{-1}$ or 340290 mms$^{-1}$) in the medium, $\Delta t_{12}$ and $\Delta t_{13}$ represent the TDOA of the sound signal from the source to the 1$^{st}$ and 2$^{nd}$ sensors and the 1$^{st}$ and 3$^{rd}$ sensors, respectively, which can be determined by taking cross-correlations among the sensors.

Source coordinates (x, y) may be obtained by solving $A_1x^2+A_2y^2+A_3xy+A_4x+A_5y+A_6=0$ where $A_i$, i=1, 2, . . . , 6, are given by, respectively, $A_1=\alpha_1^2-\alpha_2^2$, $A_2=\alpha_1^2-\alpha_3^2$, $A_3=-2\alpha_2\alpha_3$, $A_4=-2(\alpha_1^2y_1+\alpha_2\alpha_4)$, $A_5=-2(\alpha_1^2y_1+\alpha_3\alpha_4)$, and $A_6=-\alpha_1^2(x_1^2+y_1^2)-\alpha_4^2$ and $B_1x_2+B_2y^2+B_3xy+B_4x+B_5y+B_6=0$ where $B_i$, i=1, 2, . . . , 6, are given by, respectively, $B_1=b_1^2-b_2^2$, $B_2=b_1^2-b_3^2$, $B_3=-2b_2b_3$, $B_4=-2(b_1^{2x}{}_1+b_2b_4)$, $B_5=-2(b_1^2y^1+b_3b_4)$, and $B_6=b_1^2(x_1^2+y_1^2)-b_4^2$, simultaneously. The presence of coupling terms in these equations, however, poses a significant difficulty for direct solutions. To circumvent this difficulty, use:

$$\left(\frac{A_1}{A_3}-\frac{B_1}{B_3}\right)x^2+\left(\frac{A_2}{A_3}-\frac{B_2}{B_3}\right)y^2+$$

-continued $$\left(\frac{A_4}{A_3}-\frac{B_4}{B_3}\right)x+\left(\frac{A_5}{A_3}-\frac{B_5}{B_3}\right)y+\left(\frac{A_6}{A_3}-\frac{B_6}{B_3}\right)=0.$$

Next, steps are taken to obtain another equation, beginning with $c_1\sqrt{(x-x_1)^2+(y-y_1)^2}=c_2x+c_3y+c_4$, where the coefficients $c_i$, i=1, 2, . . . , 4, are given by, respectively, $c_1=2c\Delta t_{13}$, $c_2=2(x_1-x_3)$, $c_3=2(y_1-y_3)$, and $c_4=-c^2\Delta t_{13}^2-(x_1^2-x_3^2+y_1^2-y_3^2)$. The equation is squared to lead to $C_1x^2+C_2y^2+C_3xy+C_4x+C_5y+C_6=0$ where $C_i$, i=1, 2, . . . , 6, are given by, respectively, $C_1=c_1^2-c_2^2$, $C_2=c_1^2-c_3^2$, $C_3=-2c_2c_3$, $C_4=-2(c_1^2x_1+c_2c_4)$, $C_5=-2(c_1^2y_1+c_3c_4)$, and $C_6=c_1^2(x_1^2+y_1^2)-c_4^2$. Ultimately, this is results in:

$$\left(\frac{A_1}{A_3}-\frac{C_1}{C_3}\right)x^2+\left(\frac{A_2}{A_3}-\frac{C_2}{C_3}\right)y^2+$$

$$\left(\frac{A_4}{A_3}-\frac{C_4}{C_3}\right)x+\left(\frac{A_5}{A_3}-\frac{C_5}{C_3}\right)y+\left(\frac{A_6}{A_3}-\frac{C_6}{C_3}\right)=0.$$

The final equations from the above two paragraphs are rewritten in matrix form as:

$$\begin{bmatrix} D_{11} & D_{12} & D_{13} & D_{14} \\ E_{21} & E_{22} & E_{23} & E_{24} \end{bmatrix}\begin{Bmatrix} x^2 \\ y^2 \\ x \\ y \end{Bmatrix}=\begin{Bmatrix} F_1 \\ F_2 \end{Bmatrix}$$

where $D_{1i}$ and $E_{1i}$, i=1, 2, 3, and 4, are given by, respectively, $$D_{1i}=\frac{A_i}{A_3}-\frac{B_i}{B_3},$$

i=1, 2, 3, and 4;

$$E_{1i}=\frac{A_i}{A_3}-\frac{C_i}{C_3},$$

i=1, 2, 3, and 4; and $F_1$ and $F_2$ on the right side of Eq. (3.61) are given by, $$F_1=\frac{A_6}{A_3}-\frac{B_6}{B_3}, \text{ and } F_2=\frac{A_6}{A_3}-\frac{C_6}{C_3}.$$

To solve the matrix, it is pre-multiplied by a transposition of the matrix on the left side and simplified as:

$$\begin{bmatrix} G_{11} & G_{12} & G_{13} & G_{14} \\ G_{21} & G_{22} & G_{23} & G_{24} \\ G_{31} & G_{32} & G_{34} & G_{34} \\ G_{41} & G_{42} & G_{43} & G_{44} \end{bmatrix}\begin{Bmatrix} x^2 \\ y^2 \\ x \\ y \end{Bmatrix}=\begin{Bmatrix} H_1 \\ H_2 \\ H_3 \\ H_4 \end{Bmatrix}$$

where the elements are defined as $G_{ji}=D_{1j}D_{1i}+E_{2j}E_{2i}$ and $H_j=D_{1j}F_1+E_{2j}F_2$, where i, j=1, 2, 3, and 4.

Next, the matrix is converted on its left side to a triangular one, where the second, third, and fourth rows are multiplied by $G_{11}/G_{j1}$, j=2, 3, and 4, then subtract each row by the first row to obtain as follows:

$$\begin{bmatrix} G_{11} & G_{12} & G_{13} & G_{14} \\ 0 & G'_{22} & G'_{32} & G'_{24} \\ 0 & G'_{32} & G'_{33} & G'_{34} \\ 0 & G'_{42} & G'_{43} & G'_{44} \end{bmatrix} \begin{Bmatrix} x^2 \\ y^2 \\ x \\ y \end{Bmatrix} = \begin{Bmatrix} H_1 \\ H'_2 \\ H'_3 \\ H'_4 \end{Bmatrix}$$

where $G'_{ji}$ and $H'_j$ are defined as, $$G'_{ji} = \frac{G_{ji}G_{11}}{G_{J1}} - G_{1i} \text{ and } H'_j = \frac{H_jG_{11}}{G_{j1}} - H_1,$$

where i, j=2, 3, and 4.

Finally, the fourth row of the matrix is multiplied by $G''_{33}/G''_{43}$, and subtracted by the third row to obtain:

$$\begin{bmatrix} G_{11} & G_{12} & G_{13} & G_{14} \\ 0 & G'_{22} & G'_{32} & G'_{24} \\ 0 & 0 & G''_{33} & G''_{34} \\ 0 & 0 & 0 & G'''_{44} \end{bmatrix} \begin{Bmatrix} x^2 \\ y^2 \\ x \\ y \end{Bmatrix} = \begin{Bmatrix} H_1 \\ H'_2 \\ H''_3 \\ H'''_4 \end{Bmatrix}$$

where $G'''_{44}$ and $H'''_4$ are defined as, $$G'''_{44} = \frac{G''_{44}G''_{33}}{G''_{43}} - G''_{34}, \text{ and } H'''_4 = \frac{H''_4 G''_{33}}{G''_{43}} - H''_3.$$

Therefore, solutions to (x, y) are given by, $$x = \frac{H''_3}{G''_{33}} - \frac{G''_{34}H'''_4}{G''_{33}G'''_{44}}, \text{ and } y = \frac{H'''_4}{G'''_{44}}.$$

Cross Correlation

Cross-correlation between two signals u(t) and v(t) is defined as $$w(t) = u(t) \otimes v(t) \triangleq \int_{-\infty}^{\infty} u^*(\tau)v(\tau + t)d\tau,$$

where * represents complex conjugate. This complex conjugate $u^*(\tau)$ makes no difference if u(t) is of a real-valued but makes the definition work even if u(t) is a complex-valued. Substituting $\tau \rightarrow \tau - t$, you get $$w(t) = u(t) \otimes v(t) \triangleq \int_{-\infty}^{\infty} u^*(\tau - t)v(\tau)d\tau,$$

where $w$ (t) is known as the time lag or time delay of u versus v. This time lag takes the name of TDOA between two measurement locations when dealing with sound source localization.

Correlation and convolution are related as you get u(t) $\otimes$v(t)=$\int_{-\infty}^{\infty}$u*(τ)v(τ+t)dτ for correlation, and u(t)*v(t)=$\int_{-\infty}^{\infty}$u(τ)v(t−τ)dτ for convolution. Note that in correlation, the integration variable r has the same sign in both arguments, namely, u and v. Those arguments exhibit constant difference, not constant sum; therefore, v(t) isn't time-flipped.

It is worth noting that cross-correlation is the mean of the cross product of the signals. Assuming there are signals with zero mean, the cross product will reveal if there is dependency between the reference signal u(t) and the time-shifted signal v(t−τ). Consequently, when the two mentioned signals have no linear relationship between themselves (signals are uncorrelated), the cross product will produce a zero mean. On the other hand, when there is a linear dependency between the two signals under observation, it is more than likely that both signals go positive or negative simultaneously. This relationship leads to a nonzero mean.

Correlation

When a signal is correlated with itself, this is known as simply as correlation or autocorrelation, with the following definition:

$$w(t) = u(t) \otimes u(t) \triangleq \int_{-\infty}^{\infty} u^*(\tau - t)u(\tau)d\tau.$$

Since the signal is correlated with itself, there is zero-time lag, namely t=0, and it is $w$ (0)=$\int_{-\infty}^{\infty}$u*(τ−0)u(τ)dτ. Therefore, the expected time lag should be zero between a signal correlated with itself. As a result, the total energy of the signal is deduced as: $w$ (0)=$\int_{-\infty}^{\infty}$u*(τ)u(τ)dτ or $w$ (0)=$\int_{-\infty}^{\infty}$|u(τ)|²dτ=$E_u$.

Cross-Correlation as Convolution

In discrete form, convolution is one of the mathematical operations most frequently used in signal processing implementation. Finite Infinite Response (FIR) filters is achieved by convolution. With respect to autocorrelation and cross-correlation, these two operations are in essence direct convolution of the signals with a reverse-time version of themselves. In its continuous definition, correlation is defined as $w$ (t)=u(t)⊗v(t)=$\int_{-\infty}^{\infty}$u*(τ−t)v(τ)dτ. Making x(t)=u*(−t), we have $$u(t) * v(t) \triangleq \int_{-\infty}^{\infty} x(\tau - t)v(\tau)d\tau = \int_{-\infty}^{\infty} u^*(\tau - t)v(\tau)d\tau, = u(t) \otimes v(t).$$

Recalling the Fourier transformation of x(t) defined as X(f)=$\int_{-\infty}^{\infty}$x(t)e$^{-i\omega t}$dt=$\int_{-\infty}^{\infty}$u*(−t)e$^{-i\omega t}$dt, and X(f)=$\int_{-\infty}^{\infty}$u*(t) e$^{i\omega t}$dt=($\int_{-\infty}^{\infty}$u(t)e$^{-i\omega t}$dt)*. Then, ω(t)=u(t)⊗v(t)=u*(t)*v(t) ⇔W(f)=U*(f)V(f).

To differentiate convolution from correlation, note that the latter is neither an associative nor a commutative operation: v(t)⊗u(t)=v*(−t)*u(t)=u(t)*v*(−t).

Harmonic Analysis

A signal is interrogated mainly under two primary premises: detection and estimation. To discover, find, or spot whether certain elements or characteristics of an element are present or not in the data, a detection process is used. To quantify, value, amount, or size the elements or characteristics of the elements describing a signal, an estimation is applied. A classical mathematical tool that interrogates harmonically the frequency content and its relative values in the observations is the Fourier analysis and its fast calculation algorithm, the fast Fourier transform (FFT). Fourier analysis separates a function $f$(x) via integrals or sums into sine or cosine functions in an orthogonal basis. Using Fourier, a periodic function can be described as $$f(x) = \frac{1}{2}a_0 + \sum_{n=1}^{\infty} a_n \cos(nx) + \sum_{n=1}^{\infty} b_n \sin(nx).$$

The computation of the Fourier series is based on integral identities. For numerical harmonic analysis of discrete signals of N-elements, a discrete Fourier transform is invoked that is defined as $$X_k = \frac{1}{N} \sum_{n=0}^{N-1} x_n e^{\frac{-i2\pi kn}{N}},$$

where N=number of samples, n=current sample, k=current frequency, where $k \in [0, N-1]$, $x_n$=the value of the sequence at sample n, and $X_k$=the DFT that includes amplitude and phase.

By reversing the DFT, we obtain its inverse or inverse DFT (IDFT), namely $$x_n = \frac{1}{N} \sum_{k=0}^{N-1} X_k e^{\frac{i2\pi kn}{N}} \text{ and } x_n = \frac{1}{N} \sum_{k=0}^{N-1} X_k W_N^{-nk}.$$

The FFT is an efficient algorithm for calculating the DFT.

According to the disclosure a system for locating a sound source includes at least four emitter/receiver pairs, each emitter/receiver pair of the at least four emitter/receiver pairs including a laser emitter and a receiver external to an enclosed structure. The laser directs a laser beam onto a respective reflector surface location on an outer surface of the structure, the respective reflector surface location being caused to vibrate due to sound waves generated from a sound source at a sound source location within the enclosed structure. The receiver receives vibrational signals from the laser beam on the surface at the respective reflector surface location and converting the vibrational signals to acoustic signals. A processor coupled to the at least four emitter/receiver pairs for utilizing the acoustic signals to determine a time difference of arrival of the sound waves to the respective reflector surface locations to determine the sound source location within the enclosed structure based on the time difference of arrivals.

Also according to the disclosure, a method of locating a sound source in an enclosed structure includes measuring vibration signals from at least four reflector surfaces on an outer surface of the enclosed structure with at least four lasers corresponding to each of the at least four reflector surface, recording the vibration signals and converting the vibration signals into acoustic signals with at least four receivers corresponding to each of the at least four reflector surfaces, estimating a time difference of arrival of sound waves at each of the four reflector surfaces, and locating a sound source in the enclosed structure based on the time difference of arrivals of sound waves from the sound source to each of the at least four reflector surfaces.

While embodiments of the invention have been described, it is not intended that these embodiments illustrate and describe all possible forms of the invention. Rather, the words used in the specification are words of description rather than limitation, and it is understood that various changes may be made without departing from the spirit and scope of the invention.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A system for locating a sound source, comprising:
   at least four emitter/receiver pairs, each emitter/receiver pair of the at least four emitter/receiver pairs including a laser emitter and a receiver external to an enclosed structure, wherein the enclosed structure comprises a solid enclosure, the solid enclosure being denser than air;
   the respective laser emitter directing a laser beam onto a respective reflector surface location on an outer surface of the enclosed structure, the respective reflector surface location being caused to vibrate due to sound waves generated from a sound source at a sound source location within the enclosed structure, wherein the sound source is located in an elastic medium; and
   the receiver receiving vibrational signals from the laser beam on the surface at the respective reflector surface location and converting the vibrational signals to acoustic signals; and
   a processor coupled to the at least four emitter/receiver pairs for utilizing the acoustic signals to determine a time difference of arrival of the sound waves to the respective reflector surface locations to determine the sound source location within the enclosed structure based on the time difference of arrivals.

2. The system of claim 1, the at least four emitter/receiver pairs includes six emitter/receiver pairs, each of the six emitter/receiver pairs directed to respective reflector surface locations on the outer surface of the enclosed structure.

3. The system of claim 2, wherein the six emitter/receiver pairs are positioned relative to an origin position external to the enclosed structure such that when the origin position is repositioned, the six emitter/receiver pairs are repositioned relative to the origin position.

4. The system of claim 1, the enclosed structure further including a first sound source and a second sound source, the first sound source positioned at a first sound source location and the second sound source positioned at a second sound source location.

5. The system of claim 1, wherein the outer surface of the enclosed structure includes a plurality of indentations and angles.

6. The system of claim 1, wherein the sound waves are emitted from the sound source and travel from the sound source location towards an inner surface of the enclosed structure and the outer surface of the enclosed structure reacts to the sound waves impinging on the inner surface to create the vibration signals at the reflector surface locations, and wherein the sound source is located in a room of the enclosed structure.

7. The system of claim 6, the sound waves traveling towards the inner surface of the enclosed structure further includes substantially traveling through air in the enclosed structure.

8. The system of claim 6, the sound waves traveling towards the inner surface of the enclosed structure further includes substantially traveling through materials denser than air in the enclosed structure.

9. The system of claim 1, wherein:

the laser emitter is a diode laser that produces the laser beam in a visible red light; and the receiver is a photodiode receiver that generates a current when the receiver is irradiate by light from the laser beam.

10. The system of claim 1, further including an amplifier for adjusting the acoustic signals.

11. A method of locating a sound source in an enclosed structure, comprising:

measuring vibration signals from at least four reflector surfaces on an outer surface of the enclosed structure with at least four lasers corresponding to each of the at least four reflector surfaces, wherein the enclosed structure comprises a solid enclosure, the solid enclosure being denser than air;

recording the vibration signals and converting the vibration signals into acoustic signals with at least four receivers corresponding to each of the at least four reflector surfaces;

estimating a time difference of arrival of sound waves at each of the four reflector surfaces; and locating a sound source in the enclosed structure based on the time difference of arrivals of sound waves from the sound source to each of the at least four reflector surfaces, wherein the sound source is located in an elastic medium.

12. The method of claim 11, further including pre-processing the acoustic signals to enhance signal-to-noise ratios.

13. The method of claim 12, further including filtering the acoustic signals to block dc current and filter out frequencies below and above a provided frequency threshold.

14. The method of claim 12, further including amplifying the acoustic signals.

15. The method of claim 12, further including denoising and filtering the acoustic signal from time-domain signals to frequency-domain signals through fast Fourier transformation.

16. The method of claim 11, further including post-processing the time difference of arrivals to eliminate source localization errors.

17. The method of claim 11, further including positioning the at least four lasers and the at least four receivers relative to an origin position external to the enclosed structure, wherein the sound source is located in a room of the enclosed structure.

18. The method of claim 11, further including six lasers and six receivers directed at six reflector surfaces on the outer surface of the enclosed structure.

19. The method of claim 11, further including:

exciting the at least four lasers such that a laser beam is produced from each of the at least four lasers to each of the corresponding at least four reflector surfaces; and generating a current at the at least four receivers when the at least four receivers are irradiated by the laser beam of each of the at least four lasers at the corresponding at least four reflector surfaces.

20. The method of claim 11, further including cross-correlating and triangulating the time different of arrival of each acoustic signal from the at least four reflector surfaces to locate the sound source.

*    *    *    *    *